(12) United States Patent
Mortimer et al.

(10) Patent No.: US 9,492,971 B2
(45) Date of Patent: Nov. 15, 2016

(54) THERMOPLASTIC TOUGHENING MATERIAL AND RELATED METHOD

(71) Applicant: Hexcel Composites Limited, Dublin, CA (US)

(72) Inventors: Stephen Mortimer, St. Ives (GB); John Cawse, Tavistock (GB)

(73) Assignee: Hexcel Composites Limited, Cambridge (GB)

( * ) Notice: Subject to any disclaimer, the term of this patent is extended or adjusted under 35 U.S.C. 154(b) by 225 days.

(21) Appl. No.: 14/133,965

(22) Filed: Dec. 19, 2013

(65) Prior Publication Data

US 2014/0110877 A1 Apr. 24, 2014

Related U.S. Application Data

(62) Division of application No. 12/225,280, filed as application No. PCT/GB2007/001079 on Mar. 23, 2007, now abandoned.

(30) Foreign Application Priority Data

Mar. 25, 2006 (GB) .................................. 0606045.3

(51) Int. Cl.
 *B29C 70/02* (2006.01)
 *B29C 70/08* (2006.01)
 *C08J 5/24* (2006.01)

(52) U.S. Cl.
 CPC ........... *B29C 70/025* (2013.01); *B29C 70/086* (2013.01); *C08J 5/24* (2013.01)

(58) Field of Classification Search
 CPC ....... B29C 70/025; B29C 70/086; C08J 5/24

USPC ............................................................ 521/50
See application file for complete search history.

(56) References Cited

U.S. PATENT DOCUMENTS

| 3,095,607 | A | 7/1963 | Cobb |
| 4,919,810 | A | 4/1990 | Itoh et al. |
| 5,288,547 | A | 2/1994 | Elmes et al. |
| 6,242,093 | B1 | 6/2001 | Ferguson |
| 6,287,696 | B1 * | 9/2001 | Noda .......................... C08J 5/24 428/366 |
| 2004/0041128 | A1 | 3/2004 | Carter et al. |
| 2007/0190880 | A1 | 8/2007 | Dubrow et al. |
| 2012/0164455 | A1 * | 6/2012 | Griffin ....................... C08J 5/24 428/413 |

FOREIGN PATENT DOCUMENTS

| EP | 0487868 | 6/1992 |
| EP | 0496518 | 7/1992 |
| EP | 1338406 | 8/2003 |
| JP | 01320146 | 12/1989 |

OTHER PUBLICATIONS

Definition of Polysulfone, Knovel, Hawley's Condensed Chemical Dictionary, 14th Edition, 2002, John Wiley & Sons, Inc.

* cited by examiner

*Primary Examiner* — Mike M Dollinger
(74) *Attorney, Agent, or Firm* — W. Mark Bielawski; David J. Oldenkamp

(57) ABSTRACT

A non-fibrous, apertured membrane comprises at least one thermoplastic polymeric material and has a discrete porous structure. The membrane is soluble in the thermoset matrix polymer of a composite material.

15 Claims, 6 Drawing Sheets

THERMOPLASTIC TOUGHENING MATERIAL AND RELATED METHOD

This application is a divisional of copending application Ser. No. 12/225,280, which is a 371 of PCT/GB2007/001079.

The present invention relates to a thermoplastic toughening material for use in composite assemblies.

Composite materials made from a polymeric matrix and a reinforcing fibrous material are used in many commercial applications including aerospace, sports goods, transportation, civil engineering and energy generation. Some of the most commonly used composites are made from thermosetting resins with glass or carbon-fibre reinforcement. Epoxy resins are the most extensively used class of matrix polymers for high performance applications, followed by phenolics, cyanate esters, bismaleimides, benzoxazines and several less familiar chemistries. These combinations of fibre and curable polymeric matrix resins are used in an increasing variety of processes, according to the requirements of the specific application. Particularly convenient ways of utilising composites are prepreg, semi-preg, resin transfer moulding (RTM), vacuum assisted resin transfer moulding (VaRTM), liquid resin infusion (LRI), resin film infusion (RFI), pultrusion, pressure assisted moulding and several variants thereof.

Improvements in the properties of composite materials have come from various sources, and a major focus of development work has been the improvement of toughness of composite parts. Epoxy resins are inherently rather brittle, and they can be toughened by including a rubber or thermoplastic in the resin formulation. Thermoplastic additives are preferred because the glass transition temperature and modulus of the toughened matrix can be maintained by selecting a suitable thermoplastic. The thermoplastic can be soluble or insoluble in the uncured resin composition. Insoluble thermoplastic particles are therefore useful per se as toughening agents. Soluble thermoplastics work by phase separating from the matrix during the cure reaction, thereby forming a dispersed or co-continuous morphology in the final cured part.

The choice of a specific type of composite process is influenced by many factors including cost, convenience, complexity of the part to be made, health and safety considerations and mechanical performance requirements. In general, the highest performance can be achieved by the judicious assembly of layers of prepreg. This is a labour intensive operation and it is preferable to use RTM or some other resin injection or infusion method. In RTM, an infusible structure (or preform) is made from reinforcing fibres and other additives including binders, and the preform is injected or infused with liquid resin and the resin is cured at elevated temperature to form a useable component.

The composite systems used today generally have very good mechanical properties and can withstand high stresses from sources such as impact, tension and shear. However, further improvement is desirable in most cases. In particular, some specific processing methods are known to pose exacting challenges for design engineers. For example, it is very difficult to toughen RTM resins because of a viscosity increase of the resin when high molecular mass thermoplastic toughening agents are dissolved in the liquid resin.

This can make it impossible to inject the resin into a large part, because the resin begins to cure before the preform is completely filled with resin. Conversely, if the thermoplastic or rubber toughening agent is dispersed into the resin in the form of undissolved particles, these particles are then filtered by the fibre preform, resulting in a concentration gradient of the toughener, or in fact completely blocking further injection/infusion of resin.

In the area of pre-impregnated composite materials, there is little ability to precisely locate components in a depth-wise sense. Toughening particles can be blended with the resin but during impregnation of the carbon fibre reinforcement these particles are filtered by the reinforcement to create an interlayer region in the composite that is rich in toughening particles. However, this is far from ideal as the filtration process is difficult to control and some of the particles are forced into carbon fibre layers.

There have been several attempts to solve the problem of toughening resin infused components. These include EP 1317501 which discloses a soluble system for RTM whereby soluble polymeric fibres (or modes of fibres such as multi-filaments, ribbons or other combinations thereof) are interwoven with carbon tows. This approach requires the manufacture of thermoplastic fibres and subsequent weaving or other processing into a fabric reinforcement for use in composite assemblies. Such woven and spun-bonded fabrics contain crossover points that can act as stress concentrators which results in local deformation of reinforcing fibres.

EP0496518 discloses a porous polymeric membrane film for incorporation into a composite assembly in which the polymer dissolves during the curing process. Whilst useful, such films have met with limited commercial success as they do not have the same high tensile strength as non-porous films. This can lead to the film breaking during processing.

U.S. Pat. No. 6,737,158 describes a composite containing a porous polymeric membrane toughening layer. The layers of the invention are made from expanded polytetrafluoroethylene (PTFE) and remain insoluble throughout the cure process. This insolubility gives rise to a weak resin-thermoplastic interface. This weak interface between interlayer and matrix can cause poor resistance to cracking between plies, especially when exposed to a moist environment.

U.S. Pat. No. 5,288,547 discloses a process for the preparation of a composite comprising reinforcing fibers embedded in a thermosetting resin matrix. Prior to curing a porous membrane film of thermoplastic material is placed between two layers of fibres embedded in thermosetting resin. The porous membrane film is defined as a porous polymeric film, the pores of which are interconnected.

Such interconnected porous structures would create a very large specific surface area in the membrane. A large surface area of membrane tends to encourage the polymer membrane to dissolve more rapidly in the resin matrix of a composite assembly. Whilst this may be desirable in some applications, it is not the case, for example, for resin infusion applications. Here, if the membrane dissolves too quickly it leads to the undesirable effect of increasing the resin viscosity to a level that slows down further infusion of the resin through the reinforcing fibres.

Manufacture of composite assemblies falls into two broad categories, namely direct and indirect. Direct manufacture allows a cured composite assembly to be produced without intermediate product being formed. In contrast, indirect manufacture produces an intermediate prepreg which may be partially cured. The cured composite assembly is then produced off-line.

Whilst prepregs remain important to the industry, there is a general move towards direct manufacturing processes such as RTM and RFI. Direct processes are generally preferred as the problems associated with the storage of prepregs are eliminated. Furthermore, direct processes reduce waste and reduce both manufacturing times and costs as the need for an extra impregnation step is eliminated. Direct processes also allow more complex composite parts to be manufactured.

The present invention seeks to provide a membrane which finds utility in both direct and indirect manufacturing processes, wherein said membrane serves to toughen the composite assembly of which it forms part.

According to a first aspect of the present invention there is provided a non-fibrous, apertured membrane comprising at least one soluble thermoplastic polymeric material said material being at least partially soluble in a monomer and insoluble in a polymer derived from the monomer, wherein the membrane has a discrete pore structure.

In one embodiment the monomer in which the thermoplastic material is soluble comprises one or more epoxy or bismaleimide (BMI) materials. On polymerisation the monomer forms a thermosetting polymer.

The invention has particular, but not exclusive application in direct manufacturing processes for composites, such as RTM and RFI.

Typically the membranes of the invention having a discrete pore network, have a density of about 0.8 g/cm$^3$. For the purposes of the present invention a membrane having a density over 0.5 g/cm$^3$ is deemed to have a discrete pore structure.

Typically a membrane having an interconnected porous structure has a sub-micron average pore size whereas the membrane of the invention, having a discrete porous structure, has an average pore size of about 40 microns.

The membranes described herein are free from fibre crossover points that act as stress concentrators.

It is intended that the membranes described herein form part of a curable composite assembly. Therefore, by soluble it is meant at least partially soluble in a matrix resin which forms part of the assembly. Furthermore, the membrane is soluble only during cure of the assembly.

Therefore, the membranes described herein may be made from any suitable thermoplastic polymer. The polymer is limited only by its ability to dissolve in the matrix resin during curing of said resin. Such matrix resins, as will be described hereinafter, are typically thermosetting resins.

Suitable thermoplastic polymers for use in the membrane of the present invention include any of the following either alone or in combination: polyether sulfone (PES), polyetherethersulfone (PEES), polyphenyl sulfone, polysulfone, polyimide, polyetherimide, aramid, polyamide, polyester, polyketone, polyetheretherketone (PEEK), polyurethane, polyurea, polyarylether, polyarylsulfides and polycarbonates.

Although the terminal group of the chosen polymer is net material to the invention, reactive terminal groups are preferable in order to link the polymer membrane and the matrix resin upon curing. Forming such a link enhances the toughness of the cured composite assembly of which the membrane forms parts.

Preferably, the polymers of the present invention comprise at least one linking member in order to link together the polymer membrane and the matrix resin upon curing. The linking member may be a particular terminal group or a side-chain functional group present on the polymer.

Suitable terminal and/or side-chain groups include any of the following either alone or in combination: hydroxyl, chloro, amino, isocyanato, cyanato, glycidyl, carboxyl, nitro and sulfato.

The polymer preferably has a number average molecular weight in the range of from 100 to 10,000,000 daltons and most preferably from 10,000 to 1,000,000 daltons.

The membranes described herein may comprise a plurality of apertures of varying shapes so as to provide an openwork structure. Advantageously, the shape and frequency of the apertures can be tailored to the specific physical characteristics e.g. viscosity, of the resin in order that the resin can flow through the apertures and be evenly distributed through the composite assembly.

The presence of apertures climates the need to mechanically perforate a continuous membrane in order to facilitate the flow of resin therethrough. The membranes made in accordance with the matrix and described herein are stronger than mechanically perforated membranes such that the risk of tearing the film during its production is minimised.

The apertures of the present invention may take a variety of pattern formats. Non-limiting examples include, fabric (so-called linen pattern), lattice, trellis, mesh, mat, net, stipple, pyramidal, hexagonal, rhomboid, hammered, knurled, lozenge and grid.

More than one pattern format may be present in a membrane in order to achieve particular properties. For example, combining pattern formats may result in a preferential strength or infusibility in a particular region of the membrane.

These varying patterns allow a membrane to be tailored to a particular system. The pattern selection is influenced by the viscosity of the matrix resin of the composite assembly. Clearly a lower viscosity resin can pass through a smaller sized aperture and vice versa. In the case of a resin soluble membrane, the infusion of a laminate containing a membrane described herein must be performed at a temperature below the dissolution temperature of the membrane, to avoid washing or viscosity build up.

Although the membranes described hereinbefore have a fabric like appearance, such membranes are non-fibrous. It is this non-woven nature which gives the membranes described herein a significant advantage over prior art fibrous materials. The membranes described herein do not contain fibre cross-over points, as with woven fabrics, which cause local deformation of the reinforcing fibres. Furthermore the membranes described herein are of a uniform thickness. This is a particular advantage for vacuum infusion processes as it provides reduced interlayer thickness and enables higher volume fraction fibre composites to be produced, as required by the aerospace industry.

The membranes described herein preferably have an areal weight in the range of from 3 to 50 gm$^{-2}$ and more preferably in the range of from 5 to 25 gm$^{-2}$.

The membranes described herein are preferably such that from 1 to 90% of the surface area of the membrane is apertured, so as to be open. More preferably from 5 to 50% of the surface area of the membrane is apertured so as to be open.

The membranes described herein may comprise one or more additional components which are useful in the cured composite of which the membrane forms a part. Such components include, but are not limited to, may of the following either alone or in combination: toughening particles, fillers, intumescent agents, flame retardants, pigments, conducting particles, short fibres, resins and curing agents.

Toughening particles may include any of the following either alone or in combination: polyamides, copolyamides, polyimides, aramids, polyketones, polyetheretherketones, polyeesters, polyurethanes, polysulfones, high performance hydrocarbon polymers, liquid crystal polymers, PTFE, elastomers and segmented elastomers.

Preferably, toughening particles constitute from 0.1% to 80% by weight of the total weight of the membrane and most preferably from 1% to 50% by weight of the total weight of the membrane.

Suitable fillers may include any of the following either alone or in combination: silicas, alumninas, titania, glass, calcium carbonate and calcium oxide.

Preferably, fillers constitute from 0.1% to 30% by weight of the total weight of the membrane.

Suitable conducting particles include any of the following either alone or in combination: silver, copper, gold, aluminium, nickel, conducting grades of carbon, bucminsterfullerene, carbon nanotubes and carbon nanofibres. Metal coated fillers may also be used, for example nickel coated carbon particles and silver coated copper particles.

Preferably the conducting particles constitute from 0.1% to 98% by weight of the total membrane weight and more preferably from 10% to 90% by weight of the total membrane weight.

Advantageously, the membranes described herein may be used as carriers for the precise delivery of moieties to a particular location in an assembly. This is particularly beneficial for the location of moieties in an assembly in a depth wise sense.

During cure of a composite assembly the polymeric material for the membrane dissolves leaving the insoluble moieties precisely located in a depth wise sense, with the cured assembly.

Suitable insoluble moieties for inclusion in the membrane include any of the following either alone or in combination: intumescents, pigments, mould release agents, nano sized particles and conducting particles.

According to a second aspect of the present invention there is provided the use of an at least partially soluble, non-fibrous, apertured membrane comprising at least one soluble thermoplastic polymeric material for delivering at least one insoluble moiety to a precise location within a cured composite assembly and wherein said membrane has a discrete porous structure.

The present invention further seeks to provide a composite assembly having excellent toughness properties whereby it is possible to control the location of toughening agent within the assembly.

According to a further aspect of the present invention there is provided a curable composite assembly comprising a polymeric matrix resin, a fibrous reinforcement material and at least one non-fibrous, at least partially soluble, apertured, membrane wherein said membrane comprises at least one thermoplastic polymeric material soluble in the matrix resin and wherein said membrane has a discrete porous structure.

The assemblies of the present invention may be prepared by either direct or indirect processes. That is, the assemblies of the present invention may be prepreg, an indirect process, prepared by incorporating the layers into the assembly during the prepregging. Alternatively they may be assemblies prepared by direct processes, such as RTM, VaRTM or RFI.

For prepreg made by a solvent process, the membrane would be interleaved or consolidated onto the reinforcement just prior to final wind-up of the product. For hot melt prepreg processes, the membrane can either be laminated onto the reinforcement prior to final wind-up or it could be positioned on or into the reinforcement prior to combining the reinforcement with the matrix film. Such techniques are well known to those skilled in the art.

In the case of RTM, VaRTM and RFI processes, assemblies are prepared by applying the membranes described herein to the dry fibrous material of the preforms. There are some reinforcement materials such as multiaxial textiles where it is possible to locate the membrane inbetween individual layers comprising the textile. The matrix resin is of a viscosity such that, during the resin injection stage, the resin passes through the membrane into the fibrous material. These technologies are described in chapter 9 of "Manufacturing Processes for Advanced Composites", F. C. Campbell, Elseveir, 2004.

The preferred thermoset matrices for RTM processes are epoxy or bismaleimide (BMI) with suitable epoxy examples being HexFlow® RTM 6 or RTM 120. A typical BMI matrix is HexFlow® RTM 651. HexFlow® VRM 34 may be used for Vacuum-assisted Resin Transfer Moulding (VaRTM) applications. All of the above materials are available from Hexcel Composites, Duxford, UK.

The reinforcement fibres can be selected from any of the following commercially available high performance fibres which may be used alone or in combination:—aramid (e.g. Kevlar™), glass, carbon, ceramic, hemp, or polyolefin. Carbon fibres are the preferred material, particularly standard or intermediate modulus fibres of between 3000-24000 filaments per fibre tow. The desirable reinforcement form is a woven or non-crimped textile structure of between 150-1000 gm$^{-2}$ fibre areal weight. Typical weave styles include plain, satin and twill weaves. Non-crimped or multiaxial reinforcements can have a number of plies and fibre orientations such as +45/−45; 0/+45/−45; 0/+45/−45/90. Such styles are well known in the composite reinforcement field and are available from a number of companies including Hexcel Reinforcements, Villeurbanne, France.

The present invention also provides a method by which the membranes described herein can be made.

Therefore, according to a still further aspect of the preset invention there is provided a method for the preparation of a non-fibrous, at least partially soluble, apertured, porous membrane comprising at least one soluble thermoplastic polymeric material said method comprising the steps of:
a) preparing a polymer dope solution comprising said thermoplastic polymeric material in solvent;
b) casting said dope solution;
c) bringing the cast dope solution into contact with a coagulation means so as to form membrane;
d) removing at least some of the solvent from the membrane; and
e) drying the membrane.

The method of the present invention is also preferable to prior art casting processes as these do not allow for the formation of precisely defined microporous structures.

The polymer dope solution is prepared by dissolving the polymeric material in a solvent or mixture of solvents. Any solvent conventionally used for preparing polymer solution may be used. However, preferred solvents are those which are substantially entirely miscible with water. More preferably suitable solvents are aprotic solvents and most preferably suitable solvents are polar aprotic solvents.

Therefore, suitable solvents for use in the method of the present invention include any of the following either alone or in combination: dimethyl sulfoxide, dimethyl formamide, dimethylacetamide, N-methylpyrrolidone, tetramethylurea, gamma-butyrolactone, propylene carbonate and ethylene carbonate.

The solvent or solvent mixture referred to above may also comprise a co-solvent in order to modify the solution characteristics of the solvent. Suitable co-solvents include any solvent which is completely miscible with any of the aforementioned solvents. Suitable examples include glycol ethers and alcohols.

The solvent for use with the present invention may contain other soluble additives to aid in the coagulation and washing stages of the process. For example, lithium chloride, potassium chloride, calcium chloride, sodium acetate, surfactants such as sodium dodecylsulfate and the like.

The polymer dope solution of the present invention preferably comprises from 5% to 90% by weight of polymer, more preferably from 5% to 50% by weight of polymer and most preferably from 10% to 35% by weight of polymer.

The polymer dope solution may also comprise one or more additional components useful in a cured composite. Such additives include, but are not limited to, any of the following either alone or in combination: toughening particles, fillers, intumescent agents, flame retardants, pigments, conducting particles, short fibres, resins and curing agents. In fact any material that is insoluble in the coagulation and washing liquids can be added to the polymer dope solution.

Examples of suitable additional components are described above in respect of the membrane per se.

Chemically reactive components may also be included in the polymer dope solution. Suitable reactive components are preferably insoluble in the coagulation and washing liquids used in the process for the present invention. In practice, most epoxy resins cyanate ester resins and most curing agents used in thermosetting systems are very insoluble in water and are therefore suitable for use with the present invention.

The polymer dope solution may be cast onto a substrate or directly onto a patterned roller such as a gravure roller such as those used in printing processes.

Suitable substrates include sheet material comprising polyethylene and copolymers of ethylene, oriented polypropylene, polypropylene and copolymers of propylene, polyamide, polyester and similar materials. The substrates may be untreated or may be surface coated. Suitable surface coating materials include silicone release compounds with polyethylene and low density polyethylene being particularly preferred.

Alternatively, the substrate may be porous and in the form of one or more continuous belts. These substrates are well known in the papermaking industry and may comprise a wire mesh, fibre mesh, felt or similar. Such an arrangement allows for greater washing efficiency and more rapid manufacture with reduced tendency for the film material to break.

In order to provide an apertured membrane of a particular open work pattern the substrate is suitably embossed in order to create said pattern.

Following casting the material is contacted by a coagulation means in order to form a film. Said coagulation means may be a coagulation bath comprising a coagulation liquid. The coagulation liquid may be water or another liquid such as methanol, ethanol, propanols, acetone, and their aqueous mixtures. During coagulation the polymer separates into a membrane having a microporous structure.

After coagulation the polymeric membrane is passed through at least one wash bath in order to remove any coagulation liquid from the membrane. The wash bath comprises water which optionally comprises additives and solvents such as alcohols to increase the rate of washing, enzymes or other agents to accelerate the degradation of extracted solvents, wetting agents, antifoaming agents and the like. The washing stage may advantageously be conducted using warm water (up to 50° C.) and/or agitation to further increase the rate of solvent removal.

Other methods for increasing the rate of solvent removal may be employed, for example ultrasonics.

For the manufacture of a membrane having an interconnected microporous structure it is preferable to remove the majority of the solvent from the membrane during the washing stage. Following washing it is preferable that the membrane comprises a maximum of 10% solvent with respect to the total membrane weight and it is more preferable that the membrane comprises a maximum of 5% solvent with respect to the total weight of the membrane. Further solvent may be removed during the drying process.

For the manufacture of a membrane having a substantially discrete microporous structure it is preferable to remove up to 90% of solvent from the membrane. If too much solvent is removed a membrane having a discrete pore network cannot be produced. In this case, during the subsequent drying process the interconnecting sub-micron pores formed during coagulation are converted to micron sized discrete pores.

Following washing the membrane is dried. Drying is preferably achieved using one or move ovens. That said the membrane can be dried at room temperature i.e. 20-25° C. Typically, drying takes place at a temperature within the range of 70° C. to 200° C. However, the precise temperature is dependent upon the nature of the polymer from which the membrane is made and the substrate etc. Clearly drying the membrane at an elevated temperature accelerates the drying procedure.

In a further embodiment of the invention the membrane is made by casting the polymer dope onto a pre-existing veil.

According to a further aspect of the present invention there is provided an at least partially soluble, apertured membrane, comprising at least one soluble thermoplastic material secured to a substrate, the thermoplastic material having a discrete porous structure.

The preferably insoluble non-woven substrate provides strength and enables low weights of soluble polymer to be readily introduced into a composite. The resin interface between the substrate veil material and resin matrix is toughened, thereby imparting additional toughness to the final composite part.

According to a still further aspect of the present invention there is provided a method of making an at least partially soluble apertured membrane, comprising at least one soluble thermoplastic material secured to a substrate, wherein the thermoplastic material has a discrete porous structure, the method comprising the steps of:
 a) preparing a polymer dope solution comprising said thermoplastic polymeric material in solvent;
 b) providing a substrate;
 c) coating the substrate with the polymer dope solution;
 d) co-agulating the polymer dope solution so as to form a membrane comprising the polymer and substrate;
 e) removing at least some of the solvent from the membrane; and
 f) drying said membrane.

In one embodiment of the invention the substrate comprises non-woven material. The substrate would ideally comprise material used for reinforcement fibres in composite materials. Hence the substrate ideally comprises any of the following either alone or in combination:—aramid, glass, ceramic, hemp, polyamide or polyolefin. Polyamide or carbon fibres are particularly useful for forming the substrate. One suitable substrate is commercially available from Protechnic of France and is of 5 gsm weight.

This so-called hybrid membrane ideally has a weight per unit area in the range from 1 to 25 and/or a thickness in the range from 5 µm to 25 µm.

The hybrid membrane can be applied to a prepreg as a separate layer, either next to the pepreg's reinforcement or on the resin surface or otherwise used in a direct process such as within an RTM preform. The hybrid can be applied prier, during or after the impregnation process for standard film impregnation of woven or unidirectional fibres.

A preferred, but not exclusive application is in direct composite manufacturing processes, particularly those comprising unidirectional reinforcements.

As previously, in this embodiment of the invention the thermoplastic material is ideally heat treated in order to reduce its speed of dissolution in the matrix resin.

The thermoplastic material may be applied to the substrate in any desired pattern.

The present invention will now be described by way of example only and with reference to the following drawings in which.

Figure 1:
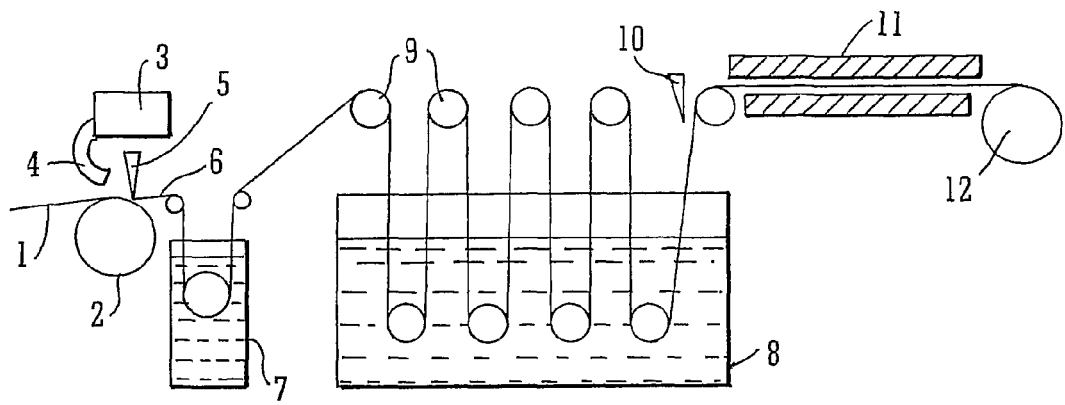
FIG. 1 is a diagrammatic representation of one embodiment of the process of the present invention.

FIG. 1 shows processing equipment whereby a substrate 1 passes over a roller 2. The substrate is suitably embossed so as to provide a membrane having a particular pore arrangement. Polymer dope contained in vessel 3 is applied on to the substrate 1 via a coating head 4. A doctor blade 5 controls the thickness of the dope coating applied to the substrate thereby affording a substrate coated with a membrane of the present invention. The coated substrate 6 passes into a coagulation bath 7 and subsequently through a wash bath 8 via a plurality of rollers 9. Air knives 10 remove water from the surface of the coated substrate. The coated substrate then passes through a drier 11 before being wound onto a reel 12. The membrane remains on the substrate for ease of use.

Figure 2:
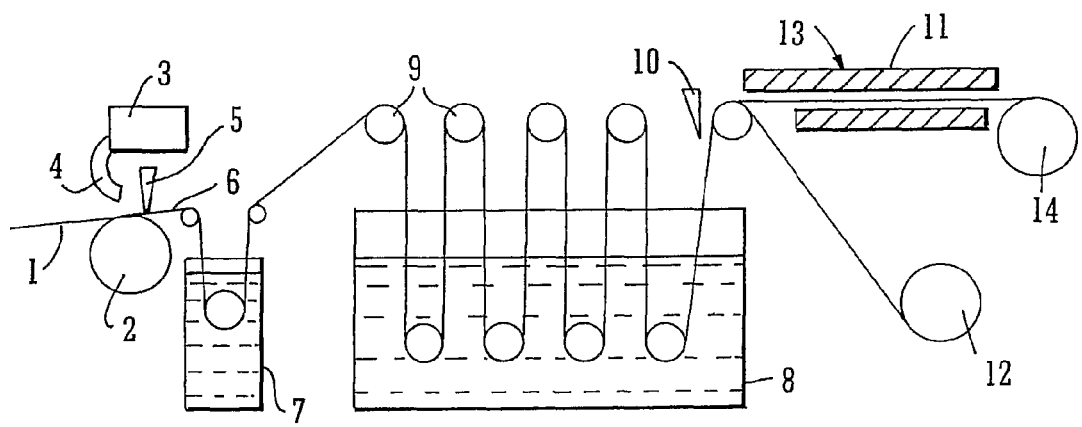
FIG. 2 is a diagrammatic representation of a second embodiment of the process of the present invention.

FIG. 2 shows a variation of the processing equipment shown in FIG. 1. Hers a substrate 1 passes over a roller 2. Polymer dope contained in vessel 3 is applied on to the substrate 1 via a coating head 4. A doctor blade 5 controls the thickness of the coating applied to the substrate thereby affording a substrate coated with a membrane of the present invention. The coated substrate 6 passes through a coagulation bath 7. Next, the coated substrate passes through a wash bath 8 via a plurality of rollers 9. Air knives 10 remove water from the surface of the coated substrate 6. The substrate 1 and the coating 11 are separated. The substrate 1 is wound onto a reel 12. The coating is passed through driers 13 and wound onto another reel 14. The coating may be applied to a second substrate, which may be the same or different to the original substrate 1, before or at roller 14.

Figure 3:
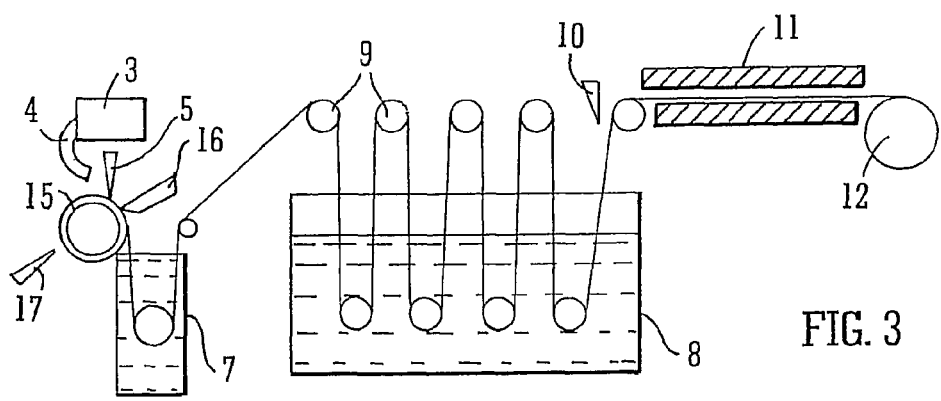
FIG. 3 is a diagrammatic representation of a third embodiment of the process of the present invention.

FIG. 3 shows a gravure roller 15 to which is applied polymer dope contained in vessel 3 by way of a coating head 4. The surface of the gravure roller is such that the membrane produced has the desired pore arrangement. A doctor blade 5 controls the thickness of the dope coating applied to the roller 15. Following application to the roller, the dope is coagulated by the application of a coagulant via applicator 16. An air knife 17 is provided to dry the roller. The cast dope passes through a coagulation bath 7, then through a wash bath 8 by way of a plurality of rollers 9 thereby affording a membrane according to the present invention. Air knives 10 remove superficial water from the surface of the membrane. The membrane then passes though a drier 11 before being wound onto a reel 12.

With regard to the apertured structure of the membranes described herein, possible aperture arrangements are shown in FIGS. 4a to 4d.

Figure 4A:
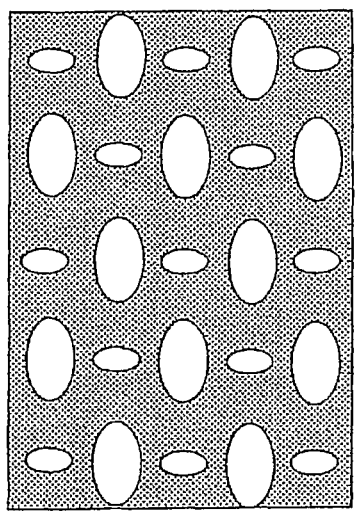
FIGS. 4a-4d are diagrammatic representations of four embodiments of membranes of the present invention having different aperture arrangements.

FIG. 4a shows an elliptical aperture arrangement.

Figure 4B:
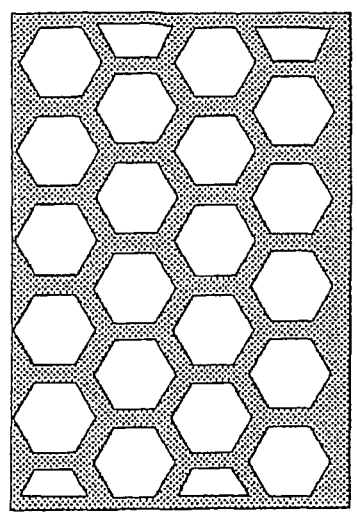

FIG. 4b shows a hexagonal aperture arrangement.

Figure 4C:
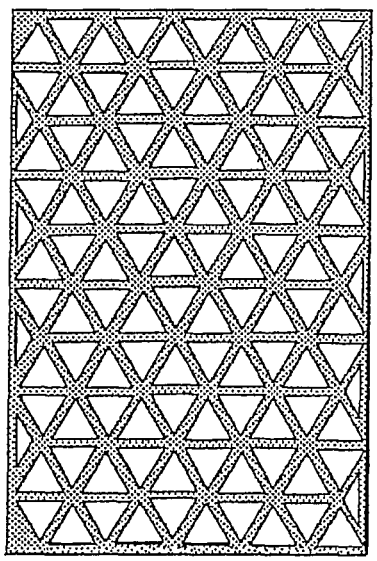

FIG. 4c shows a triangular aperture arrangement.

Figure 4D:
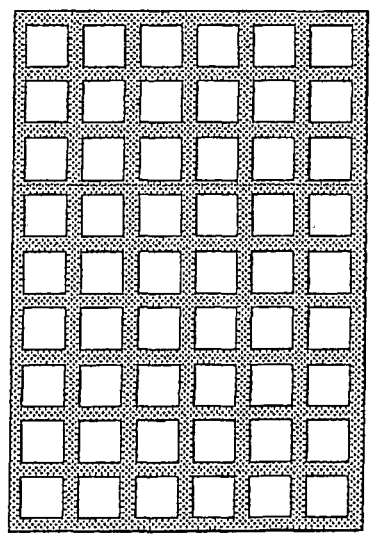

FIG. 4d shows a square aperture arrangement.

Figure 5:
FIG. 5 is a photomicrograph of a composite assembly wherein insoluble polyamide (Orgasol™) particles are precisely located therein.

FIG. 5 shows a cured composite assembly 18 having a carbon fibre reinforcement 19 and a resin rich zone 20. Insoluble polyamide (Orgasol™) particles 21 are precisely located between said reinforcement 19 and resin zone 20.

Figure 6:
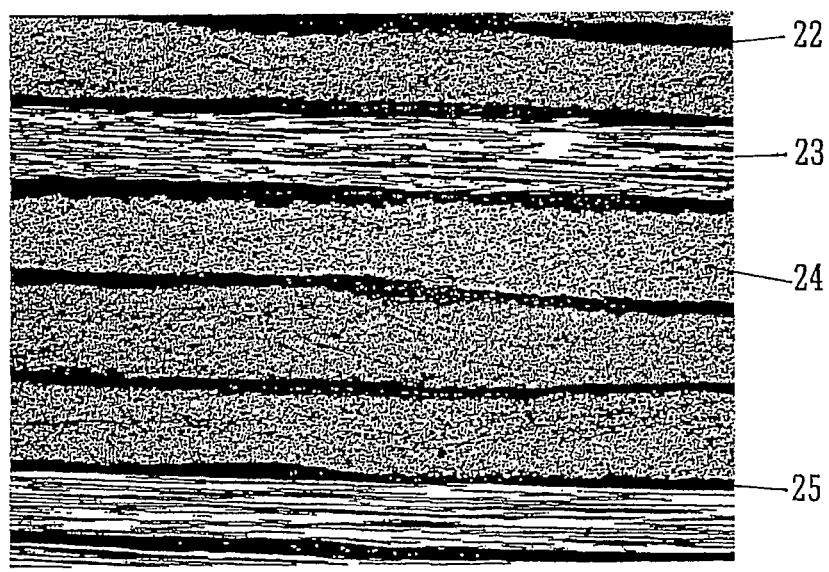
FIG. 6 is a photomicrograph of a composite assembly made from a membrane comprising discrete pores and wherein polyamide (Orgasol™) particles are precisely located therein.

FIG. 6 shows a cured composite assembly 22 having carbon fibre reinforcement 23 and 24 wherein the fibres of the reinforcement are located perpendicular to each other. A resin rich interlayer 25 is observed comprising the solubilised and phase separated membrane, and polyamide particles.

Figure 7:
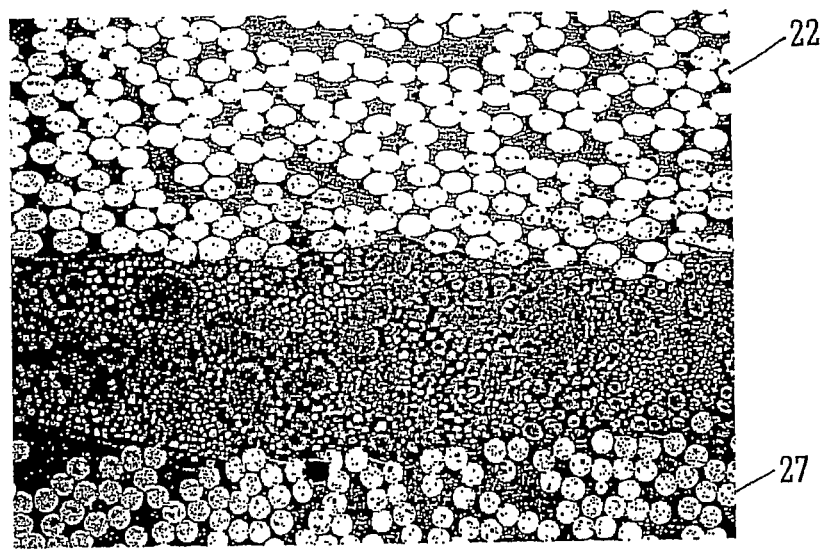
FIG. 7 is a photomicrograph of a composite assembly made from a membrane comprising discrete pores.

FIG. 7 is the cured composite assembly 22 at a higher magnification. The base matrix 27 can also be seen.

Figure 8:
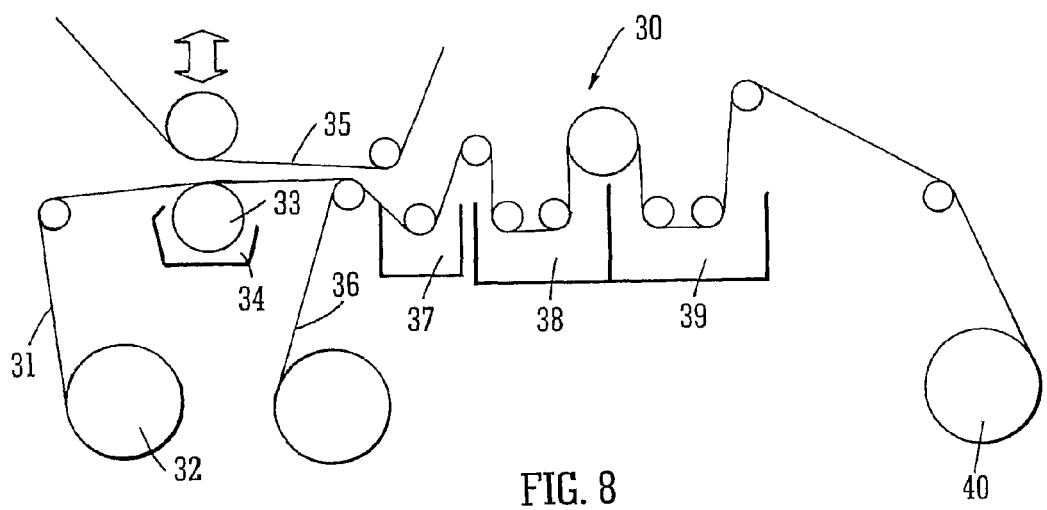
FIG. 8 is a diagrammatic representation of a further embodiment of the process of the invention.

FIG. 8 shows processing equipment 30 whereby a 5 gsm veil 31 of non-woven polyamide material is fed from a roll 32 over a coating roller 33 which coats the veil 31 with a polymer dope from a polymer dope reservoir 34. The polymer dope comprises a mixture of DMSO (dimethyl sulfoxide), PES (polyether sulfone) and Orgasol™ polyamide. Support is provided for the veil via upper and lower polythene webs 35,36. The coated veil is fed through a coagulation bath 37 and subsequently through two wash baths 38,39 charged with water. The wet coated substrate then passes to a storage roller 40. The roll 40 is subsequently passed through vertical ovens (not shown) to provide a finished dried product attached to the polythene webs which are easily removable.

The final product, not including the polythene webs, weighed approximately 6 to 7 gsm, and contained about 2-3 gsm of PES.

Figure 9:
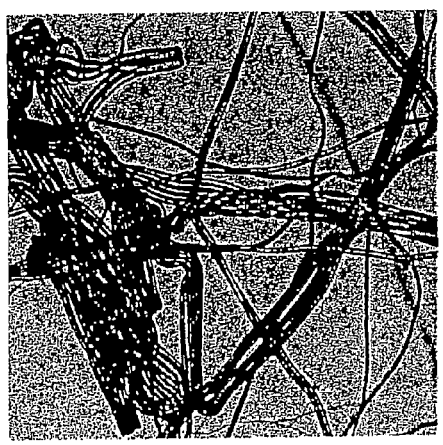
FIG. 9 is a micrograph of the non-woven material prior to coating with thermoplastic PES.
Figure 10:
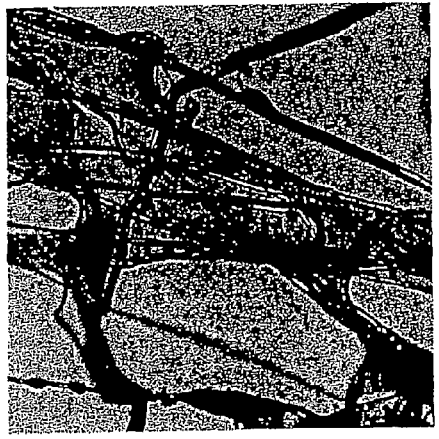
FIG. 10 is a micrograph of the non-woven material of FIG. 9 as coated with thermoplastic PES.
Figure 11:
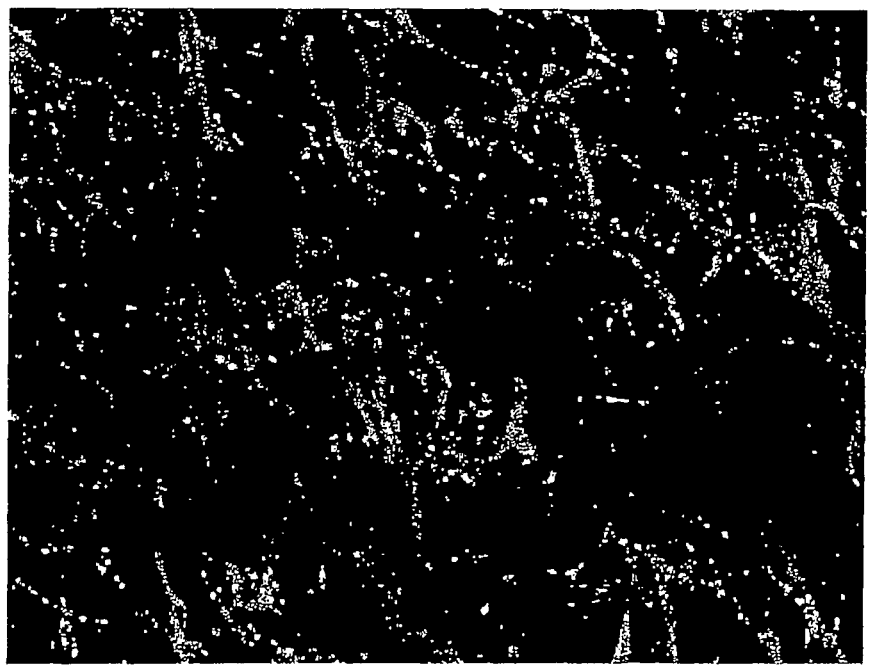
FIG. 11 is a micrograph of a further membrane in accordance with the invention.

FIG. 9 shows the polyamide veil material used in the process illustrated in FIG. 8. Here veil fibrous elements can be seen. Comparing this with FIG. 10, showing a micrograph of the coated veil, solidified PES can be observed as the transparent material between the veil fibrous elements. Likewise undissolved Orgasol, which provides additional toughening to the cured laminate, can be observed as small dark dots.

FIG. 10 shows the dried PES thermoplastic material coated on the veil. This exhibits a discrete pore arrangement, The present invention will also be described further by way of example only and with reference to the following examples.

Examples 1 to 3 describe the preparation of low porosity membranes i.e. membranes exhibiting discrete pores. An example of their use as toughening elements in RTM laminates is also described.

Examples 4 and 5 describe the preparation of porous membranes with various additives in the polymer dope.

Example 6 describes a hybrid membrane comprising a porous thermoplastic material coated on a substrate.

Example 1

10 g of lithium chloride were dissolved in water and made up to 40 ml. This solution was added to 1960 ml of N-methylpyrrolidinone (NMP). To this was added 500 g of polythersulfone (Sumikaexel, Sumitomo, Japan). The mixture was stirred at room temperature until the PES had dissolved. Orgasol 1002DNat1 (Arkema), 50 g, was added to the mixture and stirred. Using a pilot printing line the thus formed dope was cast from a pan by means of a lightly etched gravure roll onto a 30 an wide embossed polythene substrate with a hexagonal pattern, excess dope being removed with a doctor blade. The web was passed through a 20° C. water tank at a speed of 7 meters/minute to coagulate the dope and remove part of the NMP solvent. Coagulation occurred within 10 cm. The wet web was wound up and subsequently, the thus-formed PES membrane was removed from the substrate and lengths of the grid allowed to equilibrate under ambient conditions for 15 hours. The initially white grid was nearly transparent at this stage. Finally, traces of remaining solvent were removed from the membrane by washing in water for 24 hours and drying the grid.

Example 2

A PES dope was prepared as in Example 1 using 1600 g of PES, 7480 ml of dimethylsulfoxide in place of NMP, and 160 ml of a 25% solution of calcium chloride in water in place of the lithium chloride. 688 g of Orgasol 1002 DNat1 were stirred into the mixture. The resulting dope was cast into the form of a grid using a similar procedure to that described with reference to example 1 except that a preliminary drying was carried out by passing the partially washed grid through ovens heated to 90° C. to 106° C. at a 1 meter/minute web speed. The grid was finally washed free of residual solvent by immersing in water and drying. The resulting web was semi-transparent.

Example 3

A low porosity PES membrane was prepared in the same way as in Example 2 except in that the oven temperatures were 100° C.-106° C. and the line speed was 0.5 meter/minute. The final measured solvent content was 2.8% and the final washing stage was omitted in this case. The resulting membrane was semi-transparent.

Preparation of Laminates by Resin Transfer Moulding.

A 16 ply carbon fibre preform (600×300 mm) was assembled in a quasi-isotropic lay-up from Hexcel AS7 dry UD fibre tape of 268 gsm. Between each ply, a PBS membrane of approximately 15-20 gsm formed by the processes just described, was added as tabulated below.

The preform was then placed in a closed metal tool of a cavity size 4.0 mm. The mould tool was then heated to a temperature of 90° C. and injected with an epoxy RTM resin (RTM 6 available from Hexcel Composites Ltd., Dagneux, France). After injection of the resin, the temperature of the tool was raised to 180° C. and the laminate was cured for 2 hrs at 180° C. The finished laminate was c-scanned and the resulting scan showed that the laminate had been successfully infused and that no porosity was present. The laminate was then cut into test specimens for CAI (compression after impact), OHC (open hole compression) and bearing strength test. These tests were performed according to the following Airbus Industries test procedures; CAI (AITM 1.0010); OHC (AITM 1.0008); and bearing strength (AITM 1.0009). For the CAI tests, all impacts were made with an impact energy of 30 J. A similar reference laminate was made without the PES membrane and tested in the same way. The results are shown in the table below for the reference laminate and a number of PES membrane materials and are quoted as actual results and as results normalised to a fibre volume fraction of 60%.

| Example | Laminate | CAI, MPa | | OHC, MPa | | Bearing, MPa | |
|---|---|---|---|---|---|---|---|
| | | actual | normalised | actual | normalised | actual | normalised |
| Control | RTM 6 | 169 | 169 | 286 | 286 | 859 | 859 |
| 1 | RTM 6, PES membrane + 10% Orgasol | 206 | 214 | 283 | 298 | 887 | 879 |
| 2 | RTM 6, PES membrane + 10% Orgasol | 207 | 222 | | | | |
| 3 | RTM 6, PES membrane + 30% Orgasol | 200 | 212 | 287 | 302 | 838 | 874 |
| 4 | RTM 6, PES membrane + 20% | 204 | 210 | 280 | 293 | 829 | 859 |

-continued

| Example | Laminate | CAI, MPa | | OHC, MPa | | Bearing, MPa | |
|---|---|---|---|---|---|---|---|
| | | actual | normalised | actual | normalised | actual | normalised |
| | Orgasol, 2.8% solvent | | | | | | |

The results of the mechanical tests show an increase in CAI for the PES membrane laminates, demonstrating the toughening effect of the grid materials. Additionally, the results from the OHC and bearing strength tests show that these properties are not reduced by the presence of the grid. Furthermore, the presence of up to about 3% residual solvent in the grid had no significant effect on the mechanical properties.

Example 4

A solution of 0.5 grams of lithium chloride in 1.5 grams of water was added to 98 ml of 1-methylpyrrolidinone and to this was added powdered polyethersulfone (25 grams) with stirring. A clear colourless solution resulted. To this solution, 12.5 grams of Ultem 5000 polyimide particles (GE Plastics, MA, USA) (15 microns average diameter) were added. The mixture was stirred to yield a homogeneous dispersion and then cast on to a flat, stippled stainless steel surface with a pattern shown in FIG. 4a, with a pattern repeat of 2 mm. A flexible doctor blade was used to produce a uniform, thin coating on the steel surface and then the dope layer was contacted against water for 5 minutes. After drying, a membrane resulted with an area weight of 4 grams per square meter.

Example 5

A polymer dope was prepared from 98 grams of dimethylsulfoxide, 2 ml of 10% aqueous sodium acetate solution and 25 grams of polyethersulfone. 0.72 g of tetraglycidyl derivative of diaminodiphenylmethan (Araldite MY721, product of Huntsman, Basel, Switzerland) and 0.53 g of 4,4-methylenebis(2-methyl-5-isopropylaniline) (product of Lonza, Basel, Switzerland) were incorporated into 10 ml of this dope and cast on to a stippled surface and then precipitated from water. When washed and dried, the layer comprised a white, strong veil which when heated at 180° C. for two hours gave a clear, flexible, tough epoxy-reinforced PES film.

Example 6

The hybrid membrane made in accordance with the process described with reference to FIG. 8 was incorporated into a laminate in resin transfer moulding. In this moulding Hexflow® RTM6 (from Hexcel Corporation) thermoset epoxy resin was used as the matrix resin. Preforms were assembled consisting of 16 plies of 268 g aramid unidirectional fibre with a layer of non-woven material between each ply. This preform was then placed into a heated mould cavity (4 mm thickness) and Hexflow® RTM6 was injected at a temperature of 100° C. After resin injection the temperature of the mould was raised to 180° C. and the laminate cured for 2 hours at 180° C. before cooling and demoulding.

The laminates provided were tested for comparison after impact (CAI) and bearing strength and the results are shown below

| Laminate type | CA1 (MPa) | Bearing Strength (MPa) |
|---|---|---|
| RTM6 thermoset epoxy | 169 | 859 |
| RTM6 thermoset and PES/aramid hybrid membrane | 206 | 897 |

The incorporation of the PES coated aramid hybrid membrane into the composite material having the Hexflow® RTM6 thermoset resin matrix resulted in improvements in both CAT and bearing strength.

It is of course to be understood that the invention is not intended to be restricted to the details of the above embodiments which are described by way of example only.

What is claimed is:

1. A method for locating polyamide particles or copolyamide particles on the surface of a fibrous layer of a composite material, said method comprising the steps of:
   a) dissolving polyethersulfone or polyetherimide in a solvent to form a solution of thermoplastic polymer;
   b) dispersing said polyamide particles or copolyamide particles in said solution of thermoplastic polymer to form a dope solution;
   c) casting said dope solution onto a substrate surface, said substrate surface being stippled to provide a plurality of discrete embossed areas;
   d) removing a portion said dope solution from said substrate surface to expose said plurality of discrete embossed areas to form an openwork film of said dope solution, said openwork film having discrete openings therein which match said discrete embossed areas;
   e) removing the solvent from said openwork film to form an openwork membrane comprising said polyamide particles or copolyamide particles dispersed in said polyethersulfone or polyetherimide; and
   f) locating said openwork membrane on the surface of said fibrous layer to thereby locate said polyamide particles or copolyamide particles on the surface of said fibrous layer.

2. A method for locating polyamide particles or copolyamide particles on the surface of a fibrous layer of a composite material according to claim 1 wherein said solvent is removed from said openwork film by washing.

3. A method for locating polyamide particles or copolyamide particles on the surface of a fibrous layer of a composite material according to claim 1 wherein said composite material comprises a thermosetting resin selected from the group consisting of epoxy resins and bismaleimide resins.

4. A method for locating polyamide particles or copolyamide on the surface of a fibrous layer of a composite material according to claim 1 wherein said dope solution comprises an insoluble moiety selected from the group consisting of toughening particles, intumescents, pigments, mould release agents, nano-sized particles and conducting particles.

5. A method for locating polyamide particles or copolyamide particles on the surface of a fibrous layer of a composite material according to claim 2 wherein said openwork film is washed with water to remove said solvent.

6. A method for locating polyamide articles or copolyamide particles on the surface of a fibrous layer of a composite material according to claim 3 wherein said dope solution comprises an insoluble moiety selected from the group consisting of toughening particles, intumescents, pigments, mould release agents, nano-sized particles and conducting particles.

7. A method for locating polyamide particles or copolyamide particles on the surface of a fibrous layer of a composite material according to claim 1 wherein said solvent comprises a liquid selected from the group consisting of dimethyl sulfoxide, dimethyl formamide, dimethylacetamide, N-methylpyrrolidone, tetramethylurea, gamma-butyrolactone, propylene carbonate and ethylene carbonate.

8. A method for locating polyamide particles or copolyamide particles on the surface of a fibrous layer of a composite material according to claim 1 which includes the step of adding a soluble additive to said solvent, said soluble additive being selected from the group consisting of lithium chloride, potassium chloride, calcium chloride, sodium acetate and sodium dodecylsulfate.

9. A method for locating polyamide particles or copolyamide particles on the surface of a fibrous layer of a composite material according to claim 8 wherein said soluble additive is dissolved in water prior to being added to said solvent.

10. A method for locating polyamide particles or copolyamide particles on the surface of a fibrous layer of a composite material according to claim 9 wherein said solvent comprises N-methylpyrrolidone and soluble additive is lithium chloride.

11. A method for locating polyamide particles or copolyamide particles on the surface of a fibrous layer of a composite material according to claim 9 wherein said solvent comprises dimethylsulfoxide and said soluble additive is calcium chloride.

12. A method for locating polyamide particles or copolyamide particles on the surface of a fibrous layer of a composite material according to claim 1 wherein said fibrous layers comprise fibers selected from the group consisting of aramid fibers, glass fibers, carbon fibers, hemp fibers and polyolefin fibers.

13. A method for locating polyamide particles or copolyamide particles on the surface of a fibrous layer of a composite material according to claim 3 wherein said fibrous layers comprise carbon fibers.

14. A method for locating polyamide particles or copolyamide particles on the surface of a fibrous layer of a composite material according to claim 1 wherein said discrete openings in said openwork membrane make up from 5 to 50 percent of the surface area of said openwork membrane.

15. A method for locating polyamide particles or copolyamide particles on the surface of a fibrous layer of a composite material according to claim 1 wherein the areal weight of said openwork membrane is from 3 to 50 grams per square meter.

\* \* \* \* \*